(12) United States Patent
Fujikawa

(10) Patent No.: US 11,500,235 B2
(45) Date of Patent: Nov. 15, 2022

(54) ELECTRO-OPTICAL DEVICE AND ELECTRONIC APPARATUS

(71) Applicant: SEIKO EPSON CORPORATION, Tokyo (JP)

(72) Inventor: Shinsuke Fujikawa, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/369,575

(22) Filed: Jul. 7, 2021

(65) Prior Publication Data

US 2022/0011621 A1 Jan. 13, 2022

(30) Foreign Application Priority Data

Jul. 8, 2020 (JP) .............................. JP2020-117596

(51) Int. Cl.
*G02F 1/1333* (2006.01)
*G03B 21/00* (2006.01)

(52) U.S. Cl.
CPC .... *G02F 1/133308* (2013.01); *G02F 1/13332* (2021.01); *G02F 1/133331* (2021.01); *G03B 21/006* (2013.01); *G02F 2202/28* (2013.01)

(58) Field of Classification Search
None
See application file for complete search history.

(56) References Cited

U.S. PATENT DOCUMENTS

2015/0253615 A1\* 9/2015 Ryu ................... G02F 1/133602
445/24
2017/0196108 A1\* 7/2017 Inobe ................... H05K 5/0017

FOREIGN PATENT DOCUMENTS

JP 2011-158823 A 8/2011

\* cited by examiner

*Primary Examiner* — Phu Vu
(74) *Attorney, Agent, or Firm* — Oliff PLC

(57) ABSTRACT

Provided is a liquid crystal device that includes a liquid crystal panel and a holder that holds the liquid crystal panel. The holder includes a placement part on which the liquid crystal panel is placed, and a fixing part that is provided at the placement part and fixed to the liquid crystal panel via an adhesive. The fixing part includes a recessed part, and the placement part includes a first protruding part that serves as a partition between the fixing part, and an element substrate and a counter substrate.

13 Claims, 12 Drawing Sheets

ELECTRO-OPTICAL DEVICE AND ELECTRONIC APPARATUS

The present application is based on, and claims priority from JP Application Serial Number 2020-117596, filed Jul. 8, 2020, the disclosure of which is hereby incorporated by reference herein in its entirety.

BACKGROUND

1. Technical Field

The present disclosure relates to an electro-optical device and an electronic apparatus.

2. Related Art

As an electro-optical device, an active drive type liquid crystal device is known that includes a switching element for each pixel. Such a liquid crystal device is used, for example, as a light valve of a projector, which is an electronic apparatus.

The liquid crystal device includes a liquid crystal panel including a dust-proof substrate, and a holder that holds the liquid crystal panel, for example. For example, JP-A-2011-158823 discloses a liquid crystal device that is integrally formed by stacking an element substrate, a counter substrate, and a dust-proof substrate that is one size larger than the element substrate and the counter substrate to configure a liquid crystal panel. According to JP-A-2011-158823, the liquid crystal panel is fixed to a holder, via the dust-proof substrate, by an adhesive applied to four locations on a peripheral edge part of the dust-proof substrate.

However, in the liquid crystal device described in JP-A-2011-158823, since there is no structure provided that defines an adhesion position or an adhesion area between the dust-proof substrate and the holder, for example, when an amount of the adhesive applied is varied, as a result of the adhesive spreading to an unintended region, a point of action of stress acting on the dust-proof substrate from the holder may be shifted to an unintended position, or the adhesive may extend to side surfaces of the element substrate and the counter substrate, thus causing the holder to be directly fixed to the counter substrate (or the element substrate) by the adhesive. In such a case as described above, an occurrence of asymmetry of the stress acting on a display part of the liquid crystal panel, or an increase in the stress due to an increase in the adhesion part is caused. As a result, there is a problem in that a liquid crystal cell thickness of the display part changes due to an unintended effect of the stress, and a display failure such as black floating occurs.

SUMMARY

An electro-optical device includes an electro-optical panel, and a holder configured to hold the electro-optical panel. The holder includes a placement part on which the electro-optical panel is placed, and a fixing part provided at the placement part and fixed to the electro-optical panel via an adhesive. The fixing part includes a recessed part, and the placement part includes a first protruding part serving as a partition between the fixing part and the electro-optical panel.

An electronic apparatus includes the electro-optical device described above.

DESCRIPTION OF EXEMPLARY EMBODIMENTS

First Embodiment

Figure 1:
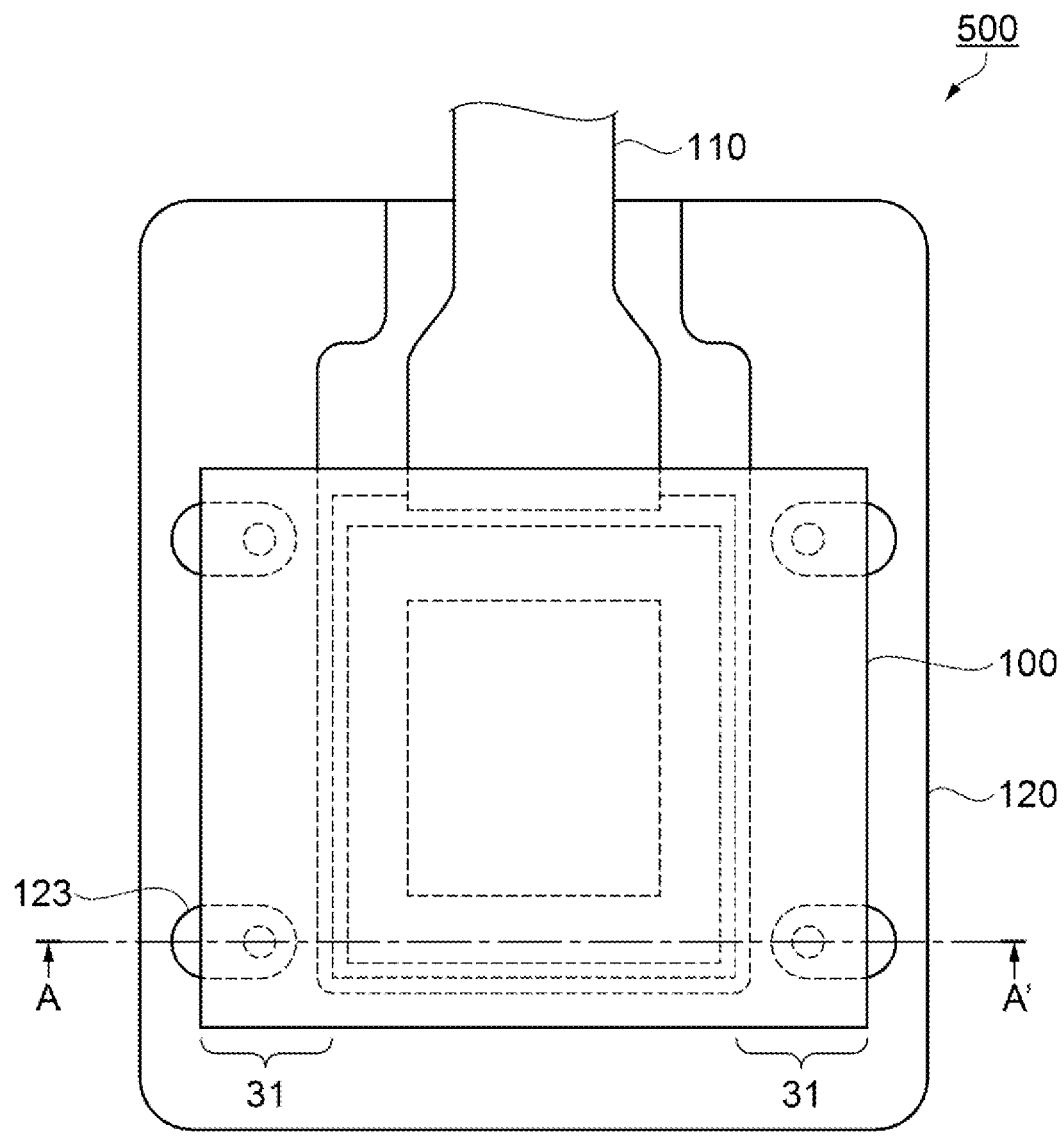
FIG. 1 is a plan view illustrating a configuration of a liquid crystal device according to a first embodiment.
Figure 1:
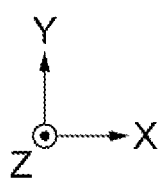
Figure 2:
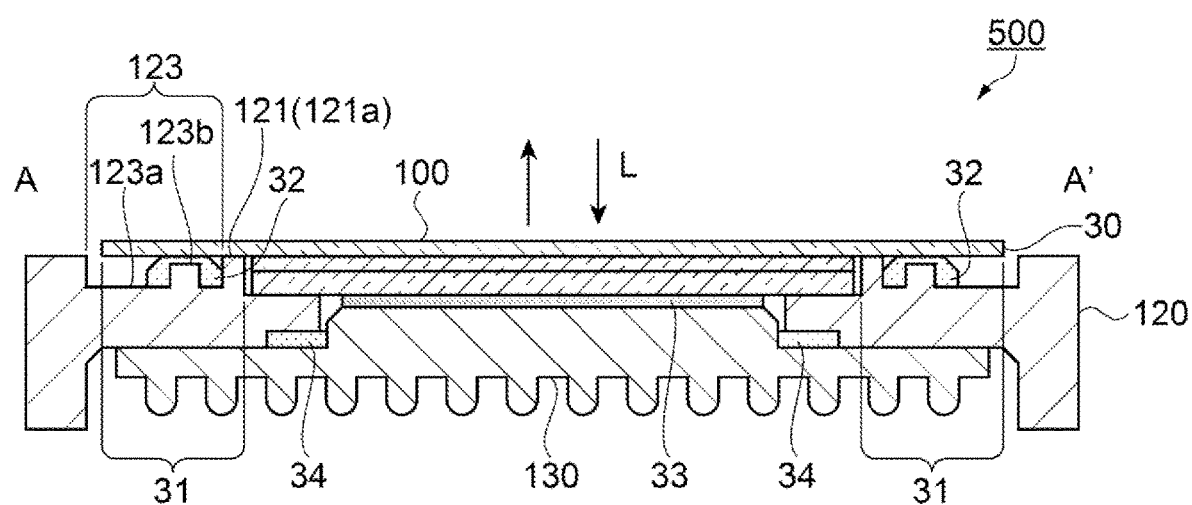
FIG. 2 is a cross-sectional view, taken along a line A-A', of the liquid crystal device illustrated in FIG. 1.

As illustrated in FIG. 1 and FIG. 2, a liquid crystal device 500, as an electro-optical device, according to a first embodiment includes a liquid crystal panel 100 as an electro-optical panel, a wiring substrate 110 coupled to one side of the liquid crystal panel 100, a holder 120 that holds the liquid crystal panel 100, and a heat sink 130. Note that FIG. 1 and FIG. 2 are illustrated with some components omitted as appropriate, within a range that does not cause a problem in describing configurations, functions, and effects of the present disclosure. The liquid crystal device 500 is, for example, a reflective liquid crystal device 500, and is used as a light valve of a projector 1500, which will be described below. Note that the wiring substrate 110 is, for example, a flexible substrate such as a flexible printed circuit (FPC).

The liquid crystal panel 100 includes an element substrate 10, a counter substrate 20 (see FIG. 4), and a dust-proof substrate 30. The dust-proof substrate 30 includes extended parts 31 that protrude from the element substrate 10 and the counter substrate 20 to be one size larger than the element substrate 10 and the counter substrate 20. As a result of the extended parts 31 of the dust-proof substrate 30 being fixed to the holder 120 by an adhesive 32, the liquid crystal panel 100 is disposed on the holder 120.

The heat sink 130 is a heat dissipation member attached to a back surface of the holder 120. The heat sink 130 is fixed, for example, to the holder 120 by an adhesive 34. In the liquid crystal panel 100, a back surface side (a lower side in FIG. 2) of the element substrate 10 is in contact with the heat sink 130, via a heat conductive grease 33 whose main agent is silicon, for example.

Figure 3:
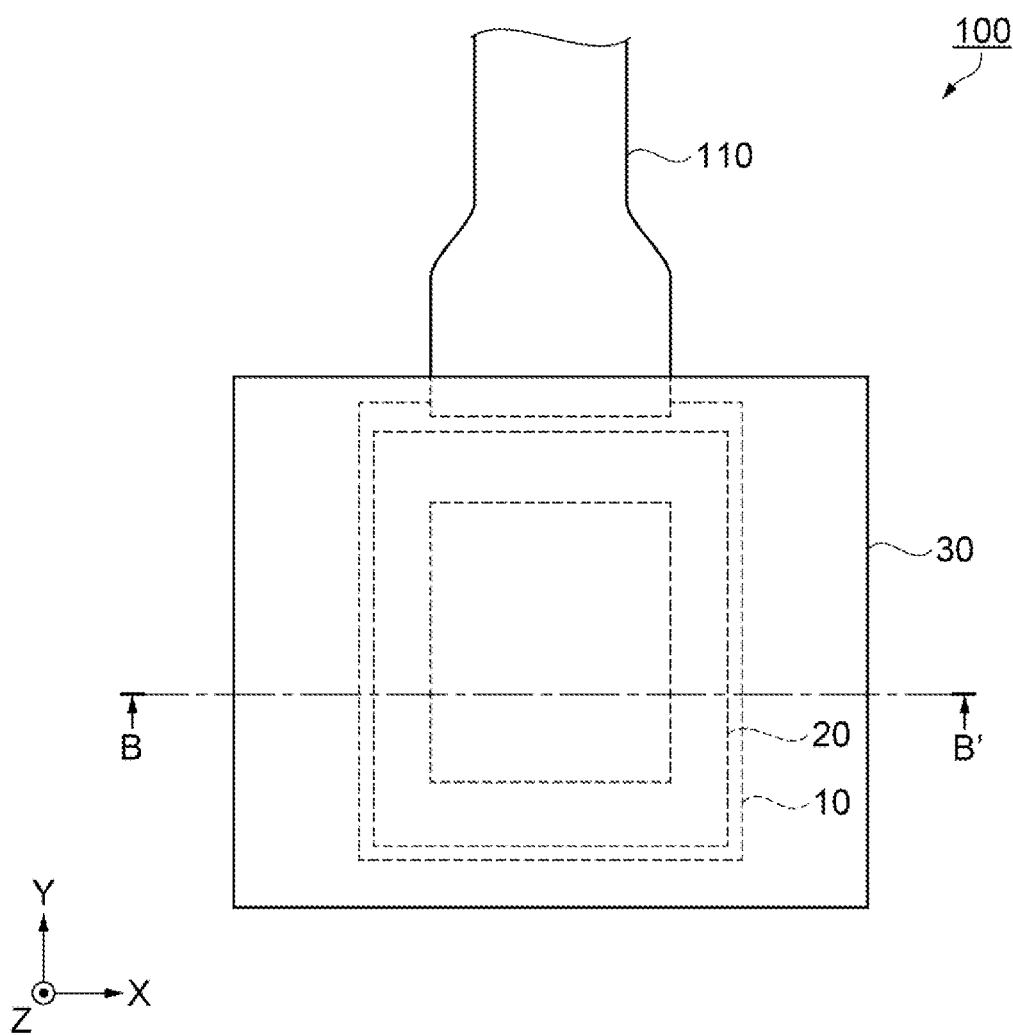
FIG. 3 is a plan view illustrating a configuration of a liquid crystal panel.
Figure 4:
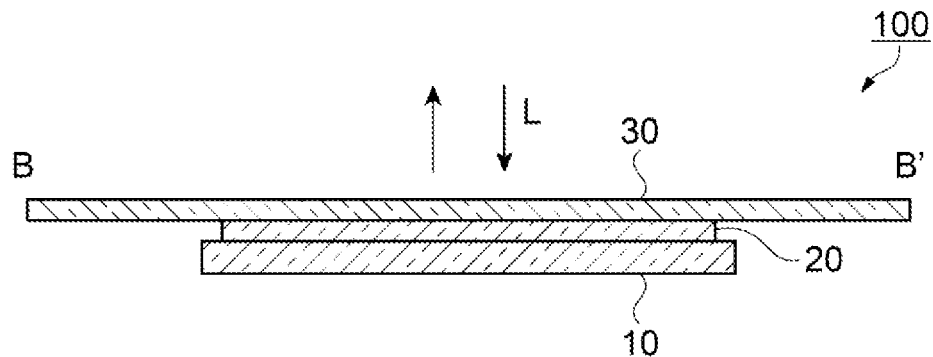
FIG. 4 is a cross-sectional view, taken along a line B-B', of the liquid crystal panel illustrated in FIG. 3.

As illustrated in FIG. 3 and FIG. 4, the liquid crystal panel 100 includes the element substrate 10 on which transistors, wiring, and the like are formed, the counter substrate 20 that is disposed facing the element substrate 10, and a liquid crystal layer (not illustrated) disposed between the element substrate 10 and the counter substrate 20. Further, in the liquid crystal panel 100, the dust-proof substrate 30 is disposed on an incident side of light L of the counter substrate 20. As described above, the dust-proof substrate 30 protrudes from the element substrate 10 and the counter substrate 20 in an X direction to a large extent. The liquid crystal device 500 has a configuration in which the light L is incident from the dust-proof substrate 30 side, for example.

The element substrate 10 is larger than the counter substrate 20, and both the substrates are bonded together via a sealing material (not illustrated) disposed along the outer periphery of the counter substrate 20. A liquid crystal having positive or negative dielectric anisotropy is encapsulated in a gap between the substrates to form the liquid crystal layer (not illustrated).

Figure 5:
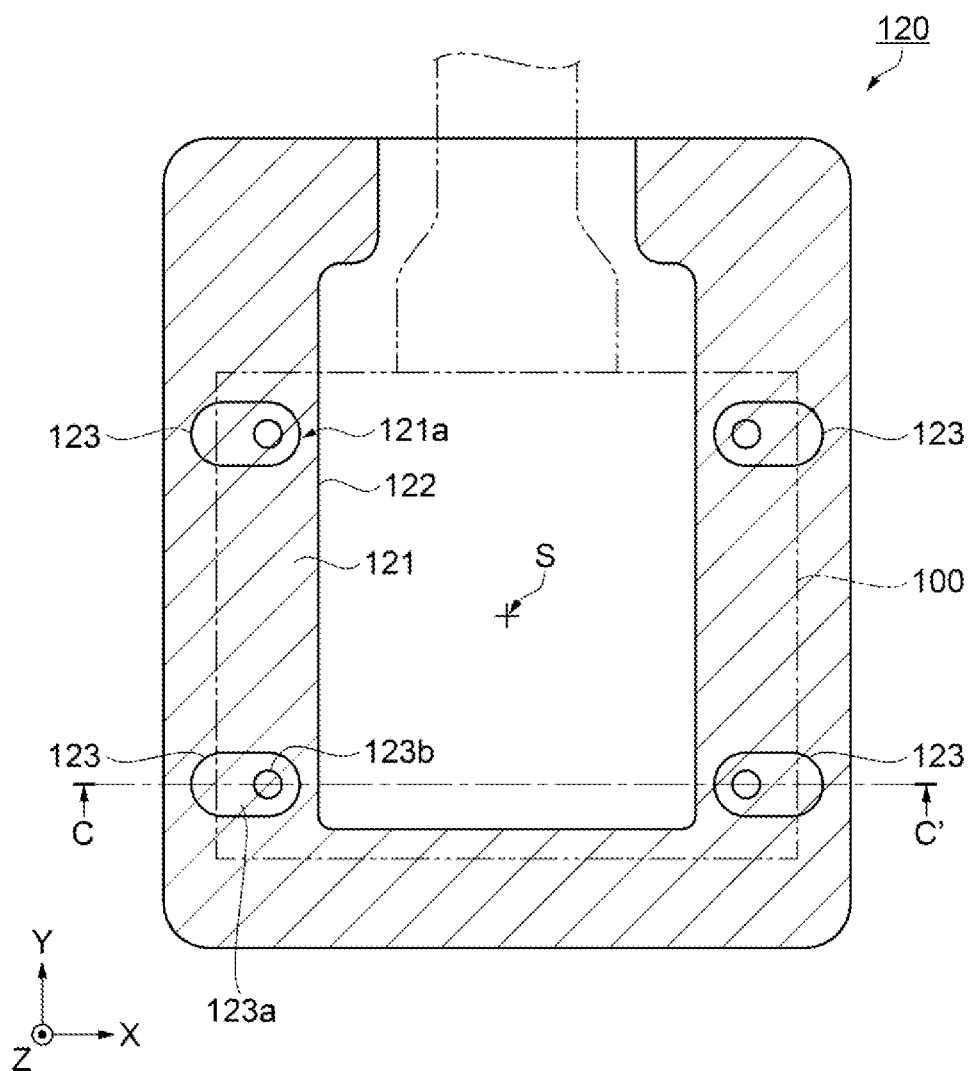
FIG. 5 is a plan view illustrating a configuration of a holder.
Figure 6:
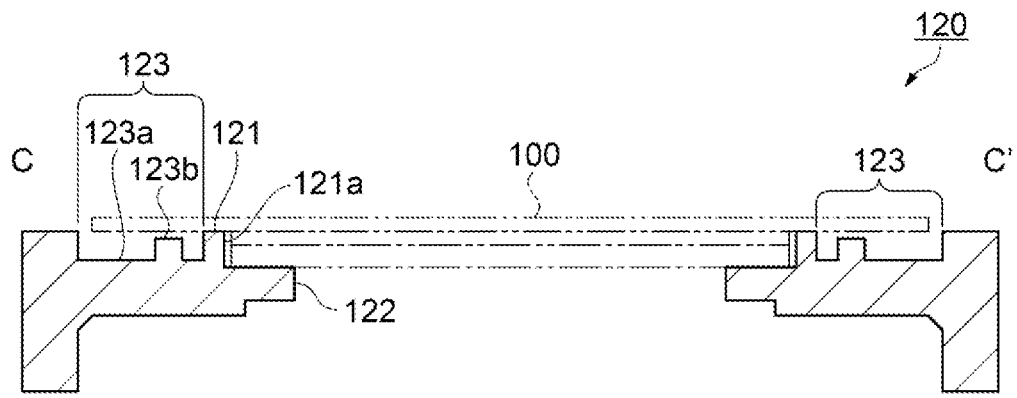
FIG. 6 is a cross-sectional view, taken along a line C-C', of the holder illustrated in FIG. 5.

As illustrated in FIG. 5 and FIG. 6, the holder 120 includes a placement part 121 that has a surface on which the liquid crystal panel 100 is placed. The placement part 121 is a portion indicated by hatching in FIG. 5. Fixing parts 123 that fix the liquid crystal panel 100 to the holder 120 are provided in regions, of the placement part 121, that overlap with the dust-proof substrate 30. The placement part 121 is favorably parallel with the liquid crystal panel 100. In other words, the placement part 121 is in close contact with the dust-proof substrate 30 of the liquid crystal panel 100. The holder 120 is a substantially rectangular member. Further, the holder 120 has a rectangular opening 122 in order to cause the liquid crystal panel 100 to be in thermal contact with the heat sink 130.

Four of the fixing parts 123 are provided in the holder 120 so as to be symmetrical with respect to a display center S. The fixing part 123 includes a recessed part 123a and a second protruding part 123b. The height of the second protruding part 123b is lower than a flat surface of the placement part 121.

A part of the recessed part 123a extends further to the outer side than the outer periphery of the dust-proof substrate 30 of the liquid crystal panel 100 in plan view. Note that "plan view" refers to viewing from a Z direction. As a result, the recessed part 123a is prevented from becoming a sealed space between the recessed part 123a and the liquid crystal panel 100. In other words, excess air in the recessed part 123a can escape, when an excess of the adhesive 32 is discharged into the recessed part 123a. As a result, the excess of the adhesive 32 applied to the second protruding part 123b can smoothly extend into the recessed part 123a.

Further, on the placement part 121, a first protruding part 121a is provided on the counter substrate 20 side (which is the same as being on the element substrate 10 side), so as to be adjacent to the recessed part 123a. The first protruding part 121a comes into contact with the dust-proof substrate 30, and serves functions of preventing the adhesive 32 from flowing to the side surfaces of the element substrate 10 and the counter substrate 20, and keeping the adhesive 32 in the recessed part 123a.

Note that in order to reduce effects of stress caused by thermal expansion or the like of the holder 120, the second protruding part 123b is preferably disposed so as to be as close as possible to the element substrate 10 and the counter substrate 20 side. For example, if a distance between two of the second protruding parts 123b having the display center S interposed therebetween is short, an amount of change in the distance between the two second protruding parts 123b during the thermal expansion of the holder 120 becomes small. Thus, stress on a liquid crystal cell, via the dust-proof substrate 30, arising from adhesion regions formed by the second protruding parts 123b becomes small. Therefore, the second protruding part 123b is preferably disposed so as to be closer to the element substrate 10 and the counter substrate 20 side. On the other hand, it is necessary to secure the recessed part 123a as a space for discharging the excess of the adhesive 32. Thus, the recessed part 123a is preferably formed so as to extend widely from the second protruding part 123b toward the outer side of the holder 120.

Next, a method of fixing the liquid crystal panel 100 to the holder 120 and the heat sink 130 will be described with reference to FIG. 7 and FIG. 8.

Figure 7:
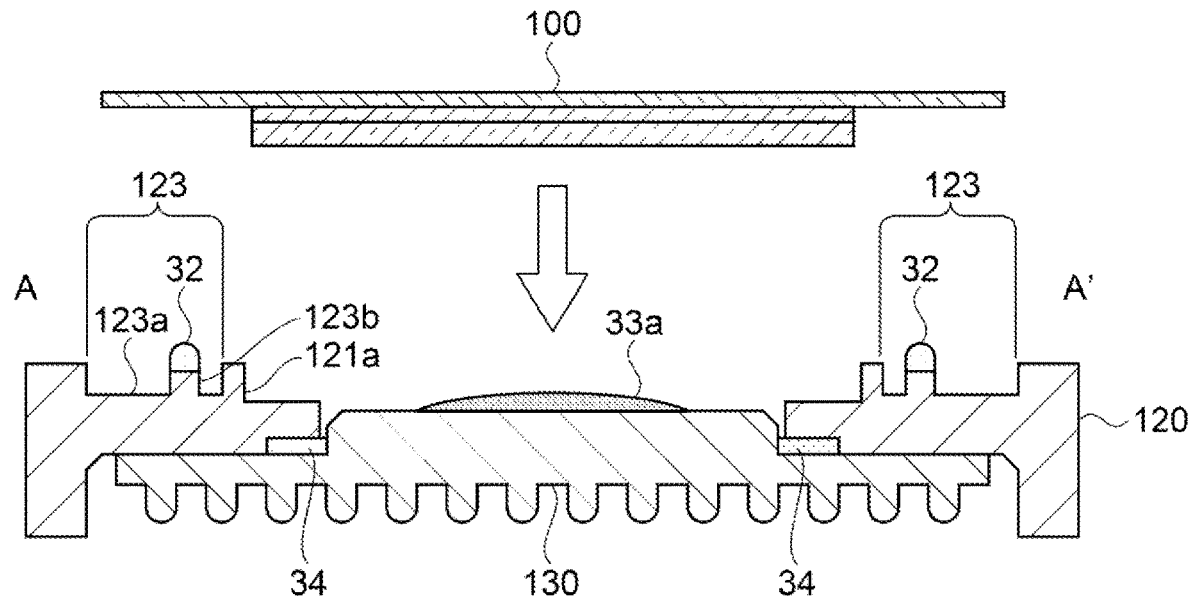
FIG. 7 is a cross-sectional view, taken along the line A-A', illustrating a part of a method of manufacturing the liquid crystal device.

As illustrated in FIG. 7, the holder 120 and the heat sink 130 are fixed to each other via the adhesive 34. The adhesive 32 is applied onto the second protruding part 123b of the holder 120 using a dispenser or the like. The adhesive 32 remains on the second protruding part 123b due to the viscosity and tension of the solution. The heat conductive grease 33 is applied onto a surface, of the heat sink 130, that comes into contact with the liquid crystal panel 100.

Figure 8:
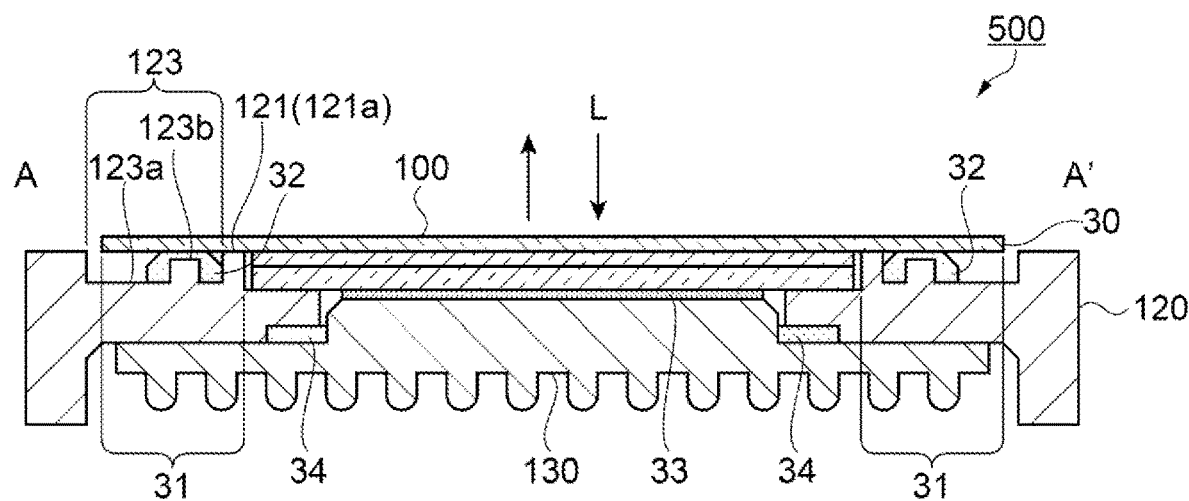
FIG. 8 is a cross-sectional view, taken along the line A-A', illustrating a part of the method of manufacturing the liquid crystal device.

Subsequently, as illustrated in FIG. 8, the liquid crystal panel 100 is placed on the holder 120 and the heat sink 130. Since an end part of the recessed part 123a of the fixing part 123 is disposed further to the outer side than the dust-proof substrate 30 in plan view, and the end part is open, the interior of the recessed part 123a is not sealed, and the excess of the adhesive 32 applied to the second protruding part 123b is smoothly discharged into the recessed part 123a. Further, since the height of the second protruding part 123b is lower than the height of the placement part 121, the adhesive 32 can be reliably caused to remain between the second protruding part 123b and the dust-proof substrate 30 in an amount sufficient to fix the liquid crystal panel 100 and the holder 120. A difference between the height of the placement part 121 and the height of the second protruding part 123b is, for example, from 0.1 mm to 0.5 mm. Note that since one side of the recessed part 123a is open, a gas released from the adhesive 32 in a drying process of the adhesive 32 can be discharged to the outside, and the adhesive 32 can thus be efficiently dried.

Further, as a result of the first protruding part 121a being provided adjacent to the fixing part 123 of the holder 120, the excess of the adhesive 32 can be inhibited from extending to the side surfaces of the element substrate 10 and the counter substrate 20. Further, since an adhesion part is defined by the position of the second protruding part 123b and an adhesion area is defined by an area of a top part of the second protruding part 123b, the fixing part 123 becomes a stable adhesion region, and the effects of stress on each of the fixing points become similar. The second protruding part 123b has, for example, a cylindrical shape having a diameter of 1 mm to 3 mm.

As a result of being pressed by the liquid crystal panel 100, the heat conductive grease 33 on the heat sink 130 extends over an entire contact surface between the liquid crystal panel 100 and the heat sink 130. At the same time, the adhesive 32 spreads while the excess thereof is discharged into the recessed part 123a, thus forming the adhesive 32 corresponding to the area of the top part of the second protruding part 123b, and the liquid crystal panel 100 and the holder 120 are fixed to each other. Further, the liquid crystal panel 100 and the heat sink 130 are brought into thermal contact with each other by the heat conductive grease 33.

Figure 9:
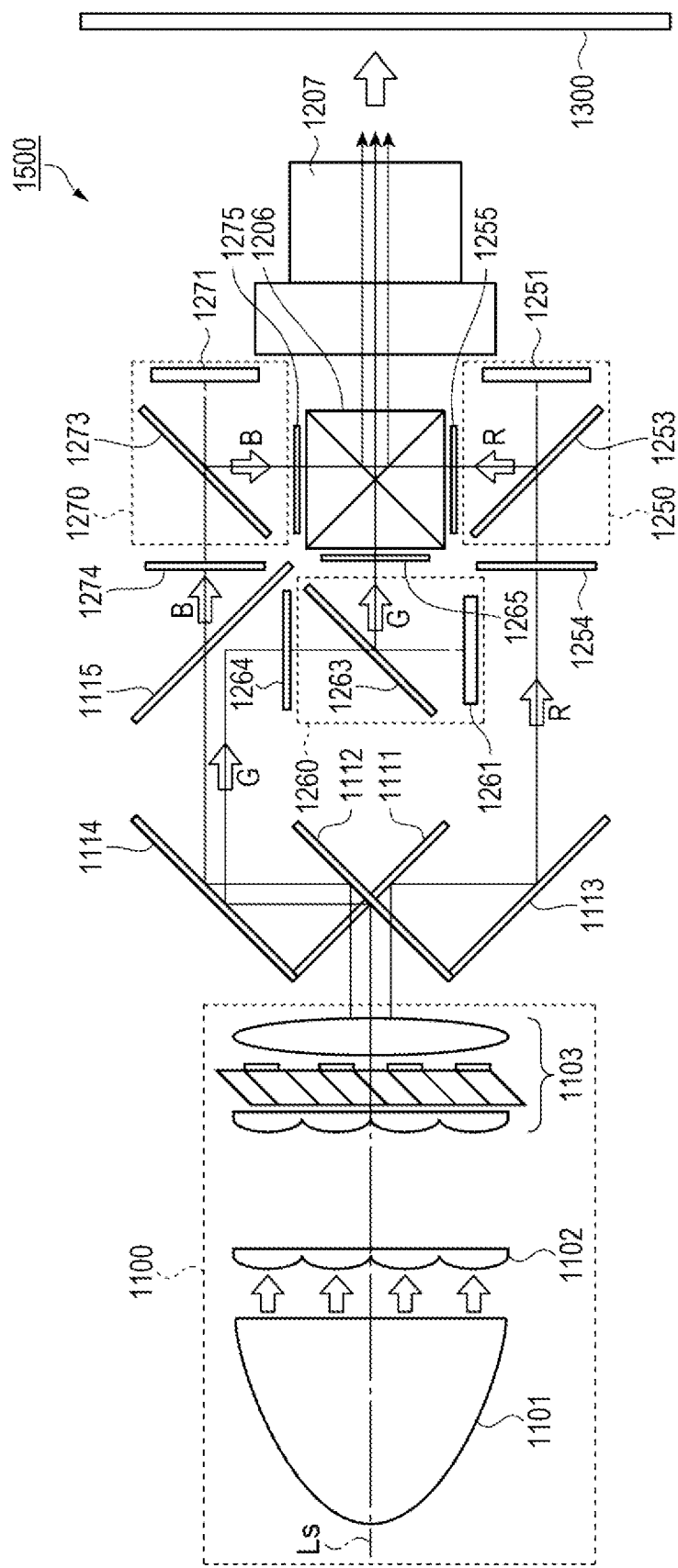
FIG. 9 is a schematic diagram illustrating a configuration of a projector as an electronic apparatus.
Figure 10:
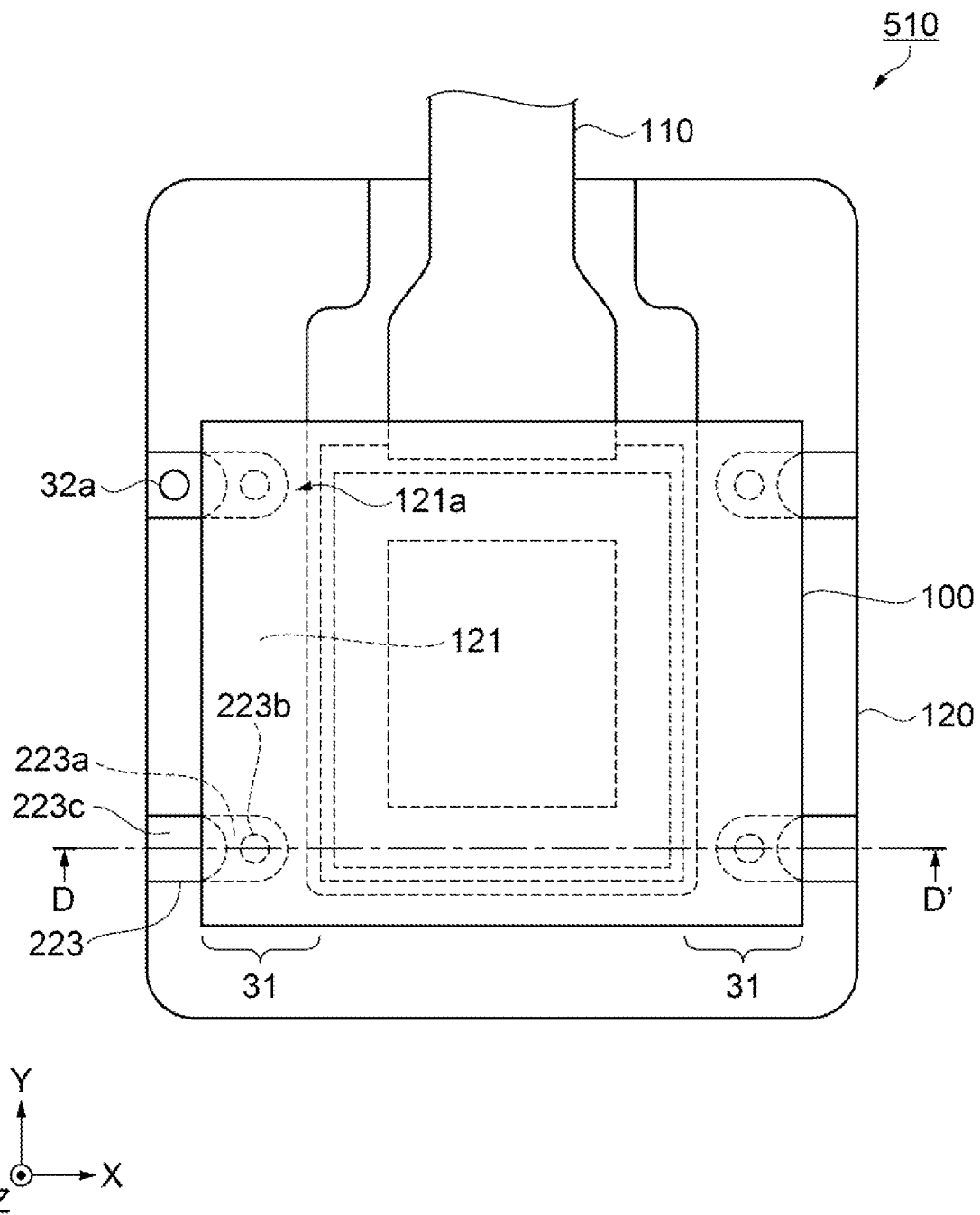
FIG. 10 is a plan view illustrating a configuration of a liquid crystal device according to a second embodiment.

As illustrated in FIG. 9, the projector 1500, as an electronic apparatus, according to this embodiment includes a polarized light illumination device 1100 disposed along a system optical axis Ls, three dichroic mirrors 1111, 1112, and 1115, two reflection mirrors 1113 and 1114, three reflective liquid crystal light valves 1250, 1260, and 1270 as optical modulation elements, a cross dichroic prism 1206, and a projection lens 1207.

The polarized light illumination device 1100 generally includes a lamp unit 1101, as a light source configured by a white light source such as a halogen lamp, an integrator lens 1102, and a polarization conversion element 1103.

Polarized light flux emitted from the polarized light illumination device 1100 is incident on the dichroic mirror 1111 and the dichroic mirror 1112 disposed to be orthogonal to each other. The dichroic mirror 1111 as a light separation element reflects red light (R) of the incident polarized light flux. The dichroic mirror 1112 as another light separation element reflects green light (G) and blue light (B) of the incident polarized light flux.

The reflected red light (R) is reflected again by the reflection mirror 1113 and enters the liquid crystal light valve 1250. On the other hand, the reflected green light (G) and blue light (B) are reflected again by the reflection mirror 1114 and enter the dichroic mirror 1115 as a light separation element. The dichroic mirror 1115 reflects the green light (G) and transmits the blue light (B). The reflected green light (G) is incident on the liquid crystal light valve 1260. The transmitted blue light (B) is incident on the liquid crystal light valve 1270.

The liquid crystal light valve 1250 includes a reflective liquid crystal panel 1251, and a wire grid polarizing plate 1253 as a reflective polarizing element.

The liquid crystal light valve 1250 is disposed so that the red light (R) reflected by the wire grid polarizing plate 1253 is perpendicularly incident on an incident surface of the cross dichroic prism 1206. Further, an auxiliary polarizing plate 1254 that compensates for a degree of polarization by the wire grid polarizing plate 1253 is disposed on an incident side of the red light (R) in the liquid crystal light valve 1250, and another auxiliary polarizing plate 1255 is disposed along the incident surface of the cross dichroic prism 1206 on an emission side of the red light (R). Note that when a polarizing beam splitter is used as the reflective polarizing element, the pair of auxiliary polarizing elements 1254 and 1255 may be omitted.

The above-described configuration of the reflective liquid crystal light valve 1250 and arrangement of each component are applied to the other reflective liquid crystal light valves 1260 and 1270 in the same manner. For example, auxiliary polarizing plates for the green light (G) are auxiliary polarizing plates 1264 and 1265, and auxiliary polarizing plates for the blue light (B) are auxiliary polarizing plates 1274 and 1275.

The respective color light beams incident on the liquid crystal light valves 1250, 1260, and 1270 are modulated based on image information, and once more enter the cross dichroic prism 1206 via the wire grid polarizing plates 1253, 1263, and 1273, respectively. In the cross dichroic prism 1206, each of the color light beams is synthesized, the synthesized light is projected onto a screen 1300 by the projection lens 1207, and an image is enlarged and displayed.

In this embodiment, the liquid crystal device 500 according to the above-described embodiment is applied as each of the reflective liquid crystal panels 1251, 1261, and 1271 in the liquid crystal light valves 1250, 1260, and 1270.

According to the projector 1500 described above, since the reflective liquid crystal devices 500 are used as the liquid crystal light valves 1250, 1260, and 1270, the reflective projector 1500 capable of improving display quality can be provided.

Note that, in addition to the projector 1500, examples of the electronic apparatus in which the liquid crystal device 500 is installed include various types of electronic apparatus such as a DLP-type projector, a head-up display, a smartphone, an electrical view finder (EVF), a mobile phone, a mobile computer, a digital camera, a digital video camera, a display, an on-board device, an audio device, an exposure device, and an illumination device.

As described above, the liquid crystal device 500 of the first embodiment includes the liquid crystal panel 100 and the holder 120 that holds the liquid crystal panel 100, and the holder 120 includes the placement part 121 on which the liquid crystal panel 100 is placed and the fixing part 123 that is fixed to the liquid crystal panel 100 via the adhesive 32. The fixing part 123 includes the recessed part 123a, and the placement part 121 includes the first protruding part 121a that serves as a partition between the fixing part 123, and the element substrate 10 and the counter substrate 20.

According to this configuration, since the first protruding part 121a is provided, the adhesive 32 in the recessed part 123a can be inhibited from extending beyond the first protruding part 121a to the element substrate 10 and the counter substrate 20 of the liquid crystal panel 100. Thus, it is possible to define a position of an adhesion point between the liquid crystal panel 100 and the holder 120, and to prevent formation of an unintended adhesion part. As a result, occurrence of a display failure caused by stress can be suppressed.

Further, the recessed part 123a preferably has an opening that does not overlap with the dust-proof substrate 30 when the liquid crystal panel 100 is viewed in plan view.

According to this configuration, since the recessed part 123a is open and includes a part communicated with the outside air, when the holder 120 and the liquid crystal panel 100 are bonded together, it is possible to prevent the recessed part 123a from being sealed.

As a result of the recessed part 123a having the opening, in the drying process of the adhesive 32, the gas released from the adhesive 32 can be discharged to the outside, and the adhesive 32 can thus be efficiently dried.

Further, since the recessed part 123a is not in a sealed state, even when dew condensation occurs in the recessed part 123a, the dew condensation can be vaporized by heating and discharged to the outside. Since the presence of moisture, which may cause deterioration of the adhesive 32, can be eliminated, reliability of the fixing part 123 is not impaired.

Further, it is preferable that the second protruding part 123b be provided in the recessed part 123a, and an upper surface of the second protruding part 123b be higher than the bottom of the recessed part 123a and lower than the placement part 121.

According to this configuration, since the second protruding part 123b is provided, an adhesion location is defined, and the adhesion area is thus defined in a self-aligned manner. Furthermore, a stable gap can be formed between the second protruding part 123b and the dust-proof substrate 30, and even when an amount of the adhesive 32 varies, a predetermined amount of the adhesive 32 can be caused to remain between the second protruding part 123b and the liquid crystal panel 100. Thus, the fixing part 123 can be formed with the stable adhesion location and adhesion area. As a result, since the stress on the liquid crystal cell from the holder 120 via the dust-proof substrate 30 can be stabilized, occurrence of the display failure, such as black floating, due to an effect of unintended stress is suppressed.

Further, since the above-described liquid crystal device 500 is provided, the projector 1500 capable of improving the display quality can be provided.

Second Embodiment

As illustrated in FIG. 10 to FIG. 13, a liquid crystal device 510 of a second embodiment differs from the liquid crystal device 500 of the first embodiment in that a structure of a fixing part 223 of the holder 120 is different from that of the fixing part 123. Other configurations are substantially the same as those of the first embodiment. Thus, in the second embodiment, parts different from those of the first embodiment will be described in detail, and a description of other parts that are the same will be omitted as appropriate.

Figure 11:
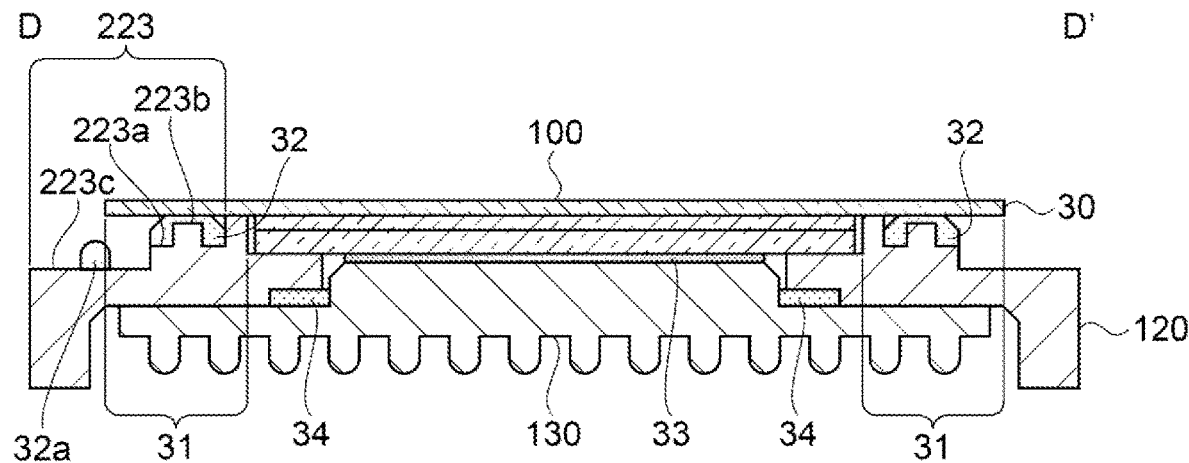
FIG. 11 is a cross-sectional view, taken along a line D-D', of the liquid crystal device illustrated in FIG. 10.

The liquid crystal device 510 of the second embodiment differs from the liquid crystal device 500 of the first embodiment in that the fixing part 223 of the holder 120 includes a first recessed part 223a, a second protruding part 223b, and a second recessed part 223c. As illustrated in FIG. 11, the depth of the first recessed part 223a is the same as that of the above-described recessed part 123a, for example. The height and shape of the second protruding part 223b are the same as those of the second protruding part 123b, for example. The depth of the second recessed part 223c is deeper than the depth of the first recessed part 223a by 1 mm to 3 mm, for example.

Further, the first recessed part 223a is formed in a substantially circular shape. The second recessed part 223c extends deeper than the depth of the first recessed part 223a, and extends from an end part of the first recessed part 223a to an end part of the holder 120 (see FIG. 10).

Figure 12:
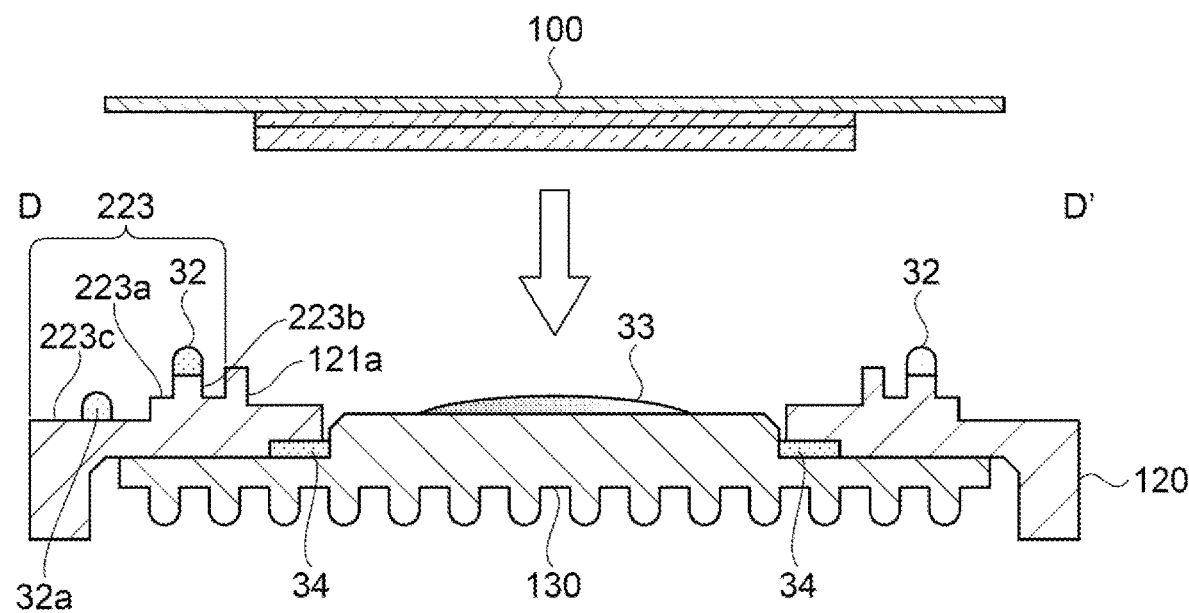
FIG. 12 is a cross-sectional view, taken along the line D-D', illustrating a part of a method for manufacturing the liquid crystal device.
Figure 13:
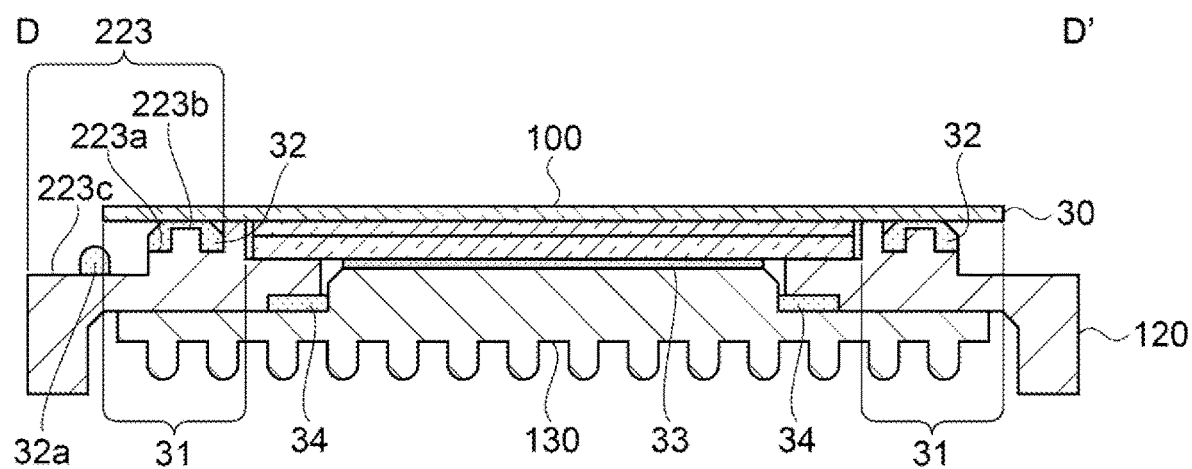
FIG. 13 is a cross-sectional view, taken along the line D-D', illustrating a part of the method for manufacturing the liquid crystal device.

As illustrated in FIG. 12, when the liquid crystal panel 100 and the holder 120 are bonded together, a dummy adhesive 32a is applied to the second recessed part 223c. Since the second recessed part 223c extends deeper than the depth of the first recessed part 223a and is disposed further to the outer side than the first recessed part 223a, the dummy adhesive 32a does not come into contact with the dust-proof substrate 30 of the liquid crystal panel 100 (see FIG. 13). Therefore, even when an amount of the dummy adhesive 32a is large, it is possible to prevent the dummy adhesive 32a from coming into contact with the dust-proof substrate 30.

Since the second recessed part 223c is disposed and the dummy adhesive 32a is first applied to the second recessed part 223c in this manner, when applying the adhesive 32 to the second protruding part 223b, a state of the dummy adhesive 32a discharged from the dispenser can be changed from an unstable state (excessive application due to an occurrence of liquid pooling of the adhesive at a nozzle tip part, for example) to a favorable state (proper application due to elimination of the liquid pooling). As a result, a predetermined amount of the adhesive 32 can be applied to the second protruding part 223b in a stable manner. The liquid pooling of the adhesive at the nozzle tip part and the like may occur when an interval between handling workpieces is long.

Note that the application of the dummy adhesive 32a can be performed on a manufacturing device side, but since the dummy adhesive 32a becomes deposited on the manufacturing device side, frequent cleaning operations are necessary, and in the worst case, there is a risk that the nozzle tip part of the dispenser may be damaged or contaminated. However, if the operation for applying the dummy adhesive 32a is performed on a clean workpiece, the above-described cleaning operations are not necessary, and the nozzle tip part is not contaminated. It is sufficient that the application of the dummy adhesive 32a be performed only once before applying the adhesive to the second protruding part 223b of the first workpiece. Note that the dummy adhesive 32a may also be applied to all four of the fixing parts 223.

As described above, the liquid crystal device 510 of the second embodiment includes the first recessed part 223a in which the second protruding part 223b is disposed, and the second recessed part 223c that is deeper than the first recessed part 223a.

According to this configuration, since the second recessed part 223c is provided, for example, when the dispenser is used for applying the adhesive 32 to the second protruding part 223b, by applying the dummy adhesive 32a first to the second recessed part 223c that does not affect the fixing between the holder 120 and the liquid crystal panel 100, it is possible to stabilize the amount of adhesive 32 subsequently applied from the dispenser. Thus, an appropriate amount of the adhesive 32 can be applied to the second protruding part 223b.

Further, the dummy adhesive 32a is preferably disposed in the second recessed part 223.

According to this configuration, when the dispenser is used for applying the adhesive 32 to the second protruding part 223b, by applying the dummy adhesive 32a first to the second recessed part 223c that does not affect the fixing between the holder 120 and the liquid crystal panel 100, it is possible to stabilize the amount of adhesive 32 subsequently applied from the dispenser. Thus, an appropriate amount of the adhesive 32 can be applied to the second protruding part 223b. Since the application operation of the dummy adhesive 32a is performed on the workpiece in this manner, a maintenance load of the manufacturing device can be reduced.

Further, the second recessed part 223c is preferably disposed further to the outer side than the first recessed part 223a.

According to this configuration, the second protruding part 223b can be disposed so as to be closer to the element substrate 10 and the counter substrate 20 side, in order to reduce the effects of the stress caused by the thermal expansion and the like of the holder 120. Further, the configuration in which the second recessed part 223c is deeper than the first recessed part 223a also helps the excess of the adhesive 32 to be discharged in a direction away from the element substrate 10 and the counter substrate 20.

Figure 14:
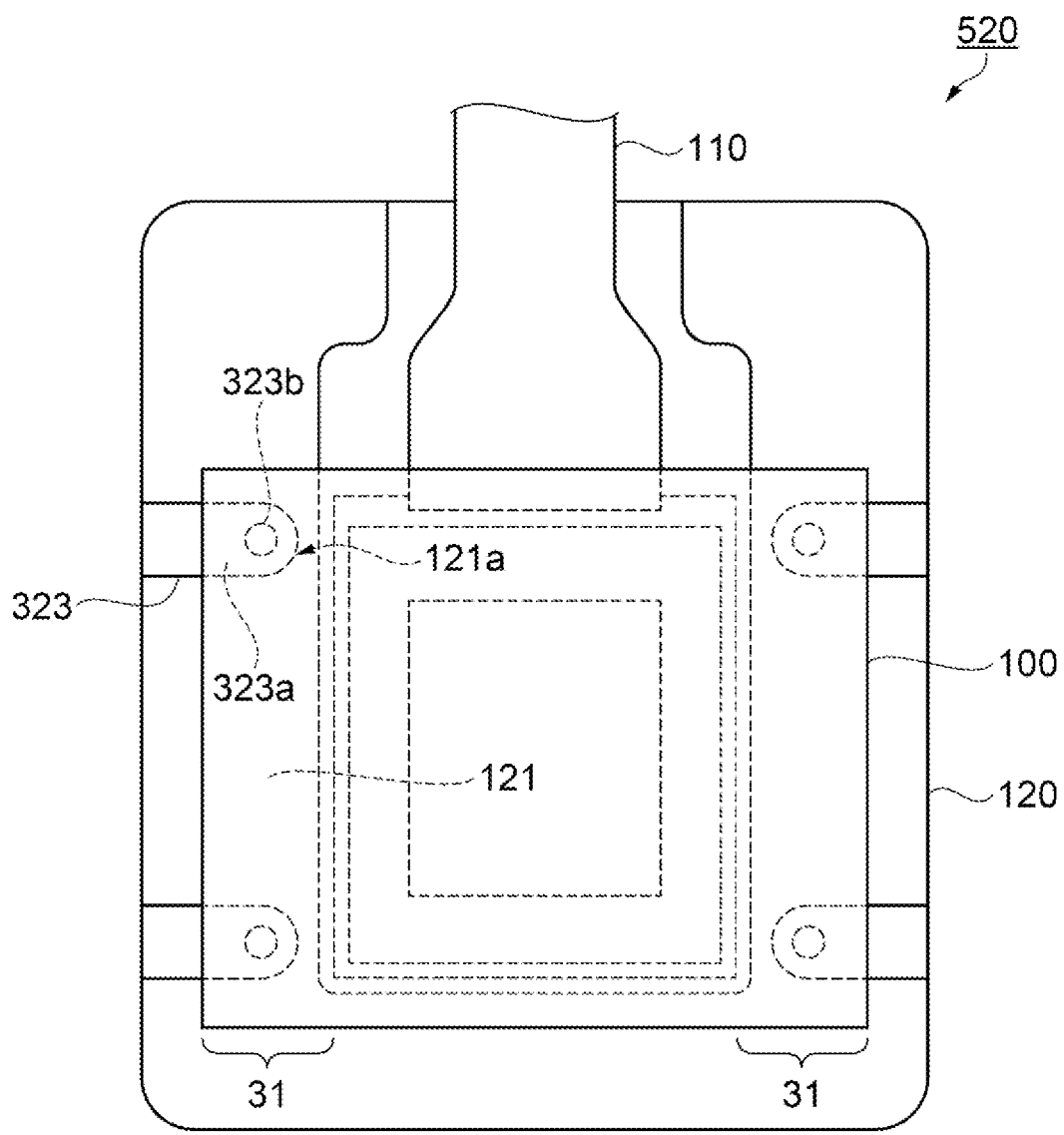
FIG. 14 is a plan view illustrating a configuration of a liquid crystal device according to a modified example.
Figure 14:
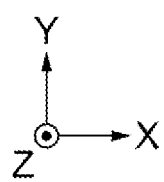

Note that the fixing part 123 of the liquid crystal device 500 according to the first embodiment is not limited to the configuration described above, and may be configured as illustrated in FIG. 14, for example. FIG. 14 is a plan view illustrating a configuration of a liquid crystal device 520 according to a modified example. As illustrated in FIG. 14, in the liquid crystal device 520, a recessed part 323a of a fixing part 323 of the holder 120 extends to the end part of the holder 120.

According to this configuration, since the shape of the recessed part 323a is simplified, machining of the holder 120 becomes easy.

Figure 15:
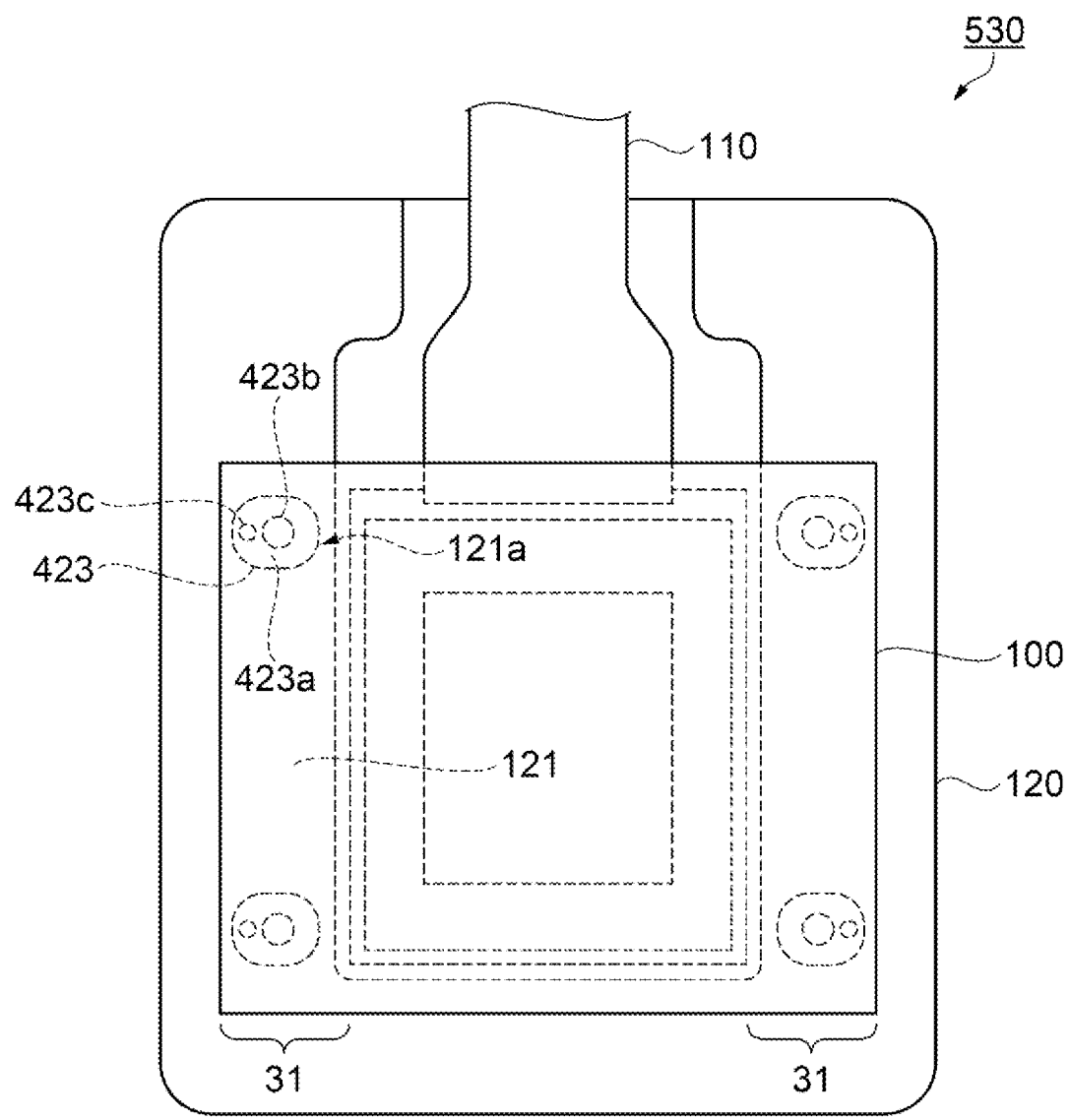
FIG. 15 is a plan view illustrating a configuration of a liquid crystal device according to a modified example.

Further, the fixing part 123 of the liquid crystal device 500 according to the first embodiment is not limited to the configuration described above, and may be configured as illustrated in FIG. 15, for example. FIG. 15 is a plan view illustrating a configuration of a liquid crystal device 530 according to a modified example. As illustrated in FIG. 15, in the liquid crystal device 530, an opening 423c is provided in a recessed part 423a of a fixing part 423 of the holder 120. The opening 423c is an air vent hole that penetrates the holder 120, and is provided on the outer side of a second protruding part 423b of the recessed part 423a.

According to this configuration, when a forming region of the recessed part 423a overlaps with the dust-proof substrate 30, since the opening 423c is provided, the interior of the recessed part 423a is not sealed, and the excess of the adhesive 32 can be smoothly extended into the recessed part 423a.

Since a path communicated with the outside air is provided by the opening 423c, in the drying process of the adhesive 32, a path for the gas released from the adhesive 32 is secured. Since the opening 423c is provided on the outer side of the second protruding part 423b in the recessed part 423a, the second protruding part 423b can be brought closer to the element substrate 10 and the counter substrate 20 side. Thus, for example, since a distance between two of the second protruding parts 423b having the display center S interposed therebetween is reduced, when the temperature increases, an amount of deformation of the distance between the two second protruding parts 423b is reduced. As a result, the stress on the liquid crystal cell via the dust-proof substrate 30 is suppressed. Furthermore, since the recessed part 423a is not present outside the dust-proof substrate 30, the holder 120 can be downsized, and thus, the liquid crystal device 530 can be made compact.

Note that the opening 423c illustrated in FIG. 15 is not limited to the form illustrated in FIG. 15, and may be configured by adopting a mode in which the first protruding part 121a is lower than the placement part 121 surrounding the first protruding part 121a by 0.1 mm to 0.3 mm, for example, and the first protruding part 121a is higher than the bottom surface of the recessed part 423a by 0.3 mm to 0.5 mm, for example. In other words, the opening 423c may be configured by providing a slight gap between the first protruding part 121a and the dust-proof substrate 30.

Even with such a configuration, since the first protruding part 121a forms a wall that is higher than the bottom surface of the recessed part 323a, the adhesive 32 can be inhibited from extending to the element substrate 10 and the counter substrate 20 side. Incidentally, the application of the adhesive 32 and the placement of the liquid crystal panel 100 are carried out with the placement part 121 facing upward. Therefore, when the opening 423c is provided in the bottom surface of the recessed part 423a, the opening 423c may be blocked by the excess of the adhesive 32. However, by providing the opening 423c at a location other than the bottom surface of the recessed part 423a, the blockage of the opening 423c by the excess of the adhesive 32 can be prevented. Thus, the path for the gas released from the adhesive 32 can always be secured.

Further, as an alternative mode, the opening 423c may be a through hole that penetrates a side wall part, of the recessed part 423a, on the opposite side from the element substrate 10 and the counter substrate 20 side, through to the outside of the holder 120. When the through hole is provided in the side wall part, since the blockage of the opening 423c by the excess of the adhesive 32 can be prevented, the path for the gas released from the adhesive 32 can always be secured.

Figure 16:
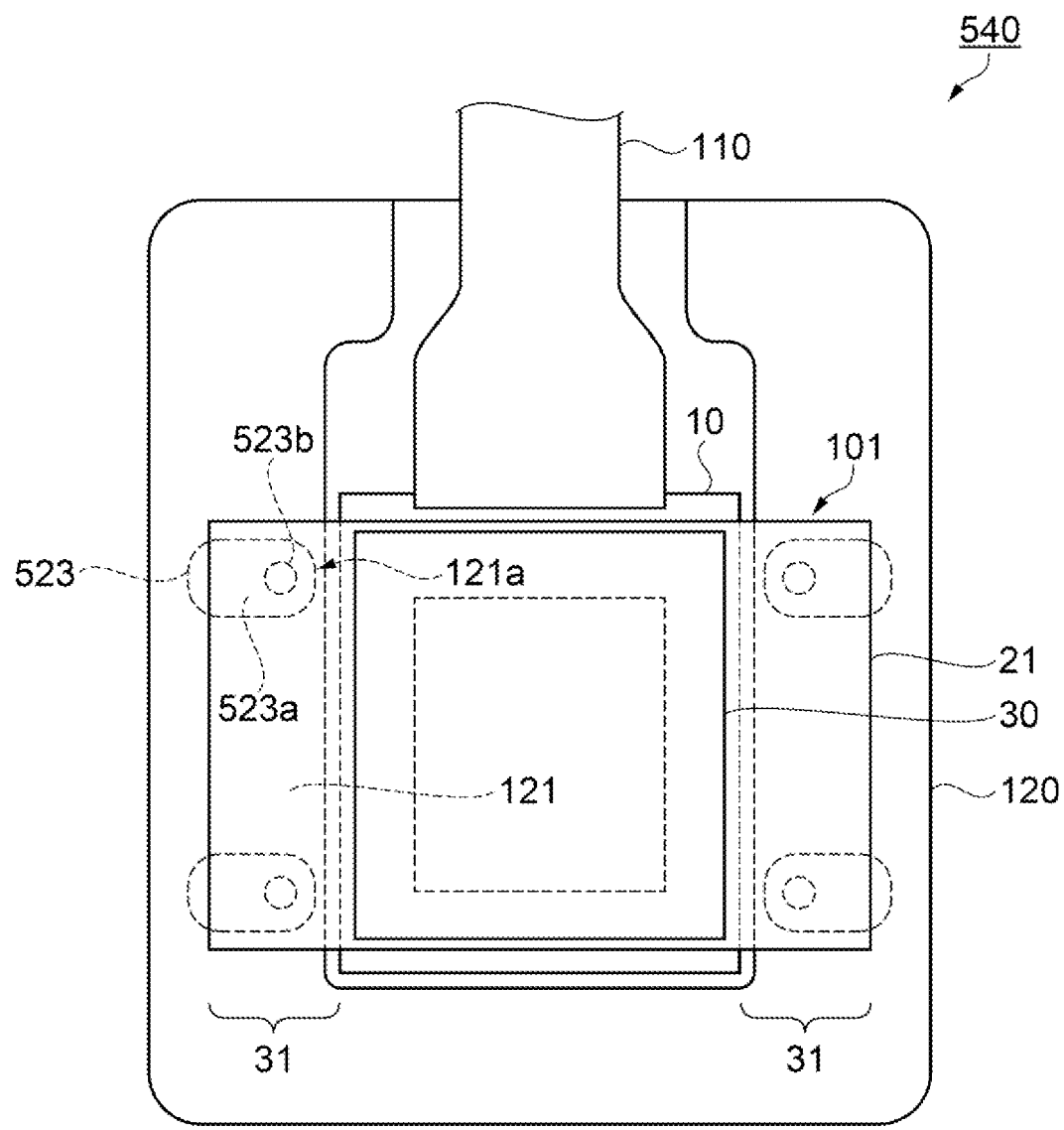
FIG. 16 is a plan view illustrating a configuration of a liquid crystal device according to a modified example.

Further, the configuration is not limited to fixing the extended parts 31 of the dust-proof substrate 30 to the holder 120, as described in the above-described embodiments, and, for example, a configuration illustrated in FIG. 16 may be adopted. FIG. 16 is a plan view illustrating a configuration of a liquid crystal device 540 according to a modified example. As illustrated in FIG. 16, the liquid crystal panel 101 of the liquid crystal device 540 includes the element substrate 10, the dust-proof substrate 30 that has substantially the same size as the size of the element substrate 10, and a counter substrate 21 that is larger than the element substrate 10 and the dust-proof substrate 30. The counter substrate 21 includes the extended parts 31 that protrude in the X direction to a large extent, and the extended parts 31 and the holder 120 are fixed to each other via fixing parts 523. A configuration of the fixing part 523 is the same as that of the fixing part 123 of the first embodiment. Note that the extended parts 31 may be provided on the element substrate 10, and the element substrate 10 and the holder 120 may be fixed to each other.

Further, the second protruding part 123b of the first embodiment has the circular shape in plan view, but the shape is not limited thereto, and may be a rectangular shape, for example. According to this configuration, by checking a spread state of the adhesive 32 using the outer shape of the second protruding part 123b as a reference, the application amount of the adhesive 32 can be adjusted. Furthermore, a top surface of the second protruding part 123b may have a slightly recessed shape formed by cutting or the like. With such a configuration, the adhesive 32 having a low viscosity can be applied on the second protruding part 123b.

Further, the second recessed part 223c in the second embodiment may be omitted, and the dummy adhesive 32a may be applied to the first recessed part 223a provided outside the dust-proof substrate 30 region. This is a configuration in which, in the first embodiment, the dummy adhesive 32a is added to the recessed part 123a illustrated in FIG. 5. A spacing distance between the outer edge of the dust-proof substrate 30 and the dummy adhesive 32a is from 1 mm to 3 mm, for example. Since the dummy adhesive 32a is applied to the region outside the dust-proof substrate 30, the adhesion part is not formed anywhere except on the second protruding part 223b. Furthermore, when the second recessed part 223c is provided, a configuration may be adopted in which the dummy adhesive 32a is applied in a region of the dust-proof substrate 30. Since the second recessed part 223c is formed to be deep, the dummy adhesive 32a and the dust-proof substrate 30 do not come into contact with each other. Thus, the adhesive part is not formed anywhere except on the fixing part 223. Therefore, the effect of stress on the liquid crystal cell due to the formation of the unintended adhesion part is prevented.

The application location of the dummy adhesive 32a is not limited to the recessed part 123a of the first embodiment, and the first recessed part 223a and the second recessed part 223c of the second embodiment. Any location in the holder 120 may be selected as long as no adhesion part with the dust-proof substrate 30 is formed, and the location does not obstruct an assembly of the liquid crystal device 500, 510 to the electro-optical device. Thus, the application location may be, for example, a notch part or the like of the holder 120, which is formed for attaching the wiring substrate 110. If the application location is such a notch part, there is a margin space around the notch part, so the application of the dummy adhesive 32a is easy, and the presence of the dummy adhesive 32a does not cause any significant problem. At this time, even if the dummy adhesive 32a comes into contact with the wiring substrate 110, no problem arises.

What is claimed is:

1. An electro-optical device comprising:
   an electro-optical panel; and
   a holder configured to hold the electro-optical panel, wherein
   the holder includes
   a placement surface on which the electro-optical panel is placed,
   a recessed part recessed relative to at the placement surface, and
   an adhesive within the recessed part so that the holder is fixed to the electro-optical panel via the adhesive,
   the placement surface includes a portion that functions as a partition between the adhesive in the recessed part and a portion of the electro-optical panel that is not over the recessed part.

2. The electro-optical device according to claim 1, wherein
   the recessed part includes a part not overlapping with the electro-optical panel when the electro-optical panel is viewed in plan view.

3. The electro-optical device according to claim 1, wherein
   a protruding part is in the recessed part, and
   an upper surface of the protruding part is higher than a bottom of the recessed part and is lower than the placement surface.

4. The electro-optical device according to claim 3, wherein
   the recessed part includes a first recessed part with the protruding part within the first recessed part, and a second recessed part that is deeper than the first recessed part.

5. The electro-optical device according to claim 4, wherein
   a dummy adhesive is in the second recessed part.

6. The electro-optical device according to claim 4, wherein
   the second recessed part is outside the first recessed part with respect to a display center.

7. An electronic apparatus, comprising:
   the electro-optical device according to claim 1.

8. An electro-optical device comprising:
   an electro-optical panel; and
   a holder configured to hold the electro-optical panel, wherein
   the holder includes a placement part at which the electro-optical panel is placed, and a fixing part at the placement part and fixed to the electro-optical panel via an adhesive,
   the fixing part includes a recessed part, and
   the placement part includes a first protruding part serving as a partition between the fixing part and the electro-optical panel, wherein
   a second protruding part is in the recessed part, and
   an upper surface of the second protruding part is higher than a bottom of the recessed part and is lower than the placement part.

9. The electro-optical device according to claim 8, wherein
   the recessed part includes a part not overlapping with the electro-optical panel when the electro-optical panel is viewed in plan view.

10. The electro-optical device according to claim 8, wherein
    the recessed part includes a first recessed part in which the second protruding part is disposed, and a second recessed part that is deeper than the first recessed part.

11. The electro-optical device according to claim 10, wherein
    a dummy adhesive is disposed in the second recessed part.

12. The electro-optical device according to claim 10, wherein
    the second recessed part is disposed outside the first recessed part with respect to a display center part.

13. An electronic apparatus, comprising:
    the electro-optical device according to claim 8.

* * * * *